United States Patent
Rein et al.

(10) Patent No.: US 6,466,460 B1
(45) Date of Patent: Oct. 15, 2002

(54) HIGH EFFICIENCY, LOW VOLTAGE TO HIGH VOLTAGE POWER CONVERTER

(75) Inventors: John M. Rein, Elgin, IL (US); Jeffrey C. Perkins, Roselle, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/939,102

(22) Filed: Aug. 24, 2001

(51) Int. Cl.[7] .................. H02M 3/335; H02M 7/44; H02H 7/122
(52) U.S. Cl. .................. 363/21.02; 363/21.04; 363/56.1; 363/97
(58) Field of Search .................. 363/21.02, 21.03, 363/21.04, 56.1, 56.09, 97

(56) References Cited

U.S. PATENT DOCUMENTS

| | | |
|---|---|---|
| 3,092,750 A | 6/1963 | Haus et al. |
| 4,318,165 A * | 3/1982 | Kornrumpf et al. ..... 363/21.02 |
| 4,410,936 A | 10/1983 | Suzuki |
| 4,607,323 A | 8/1986 | Sokai et al. |
| 4,720,668 A | 1/1988 | Lee et al. |
| 4,777,406 A | 10/1988 | Ross et al. |
| 4,866,344 A | 9/1989 | Ross et al. |
| 4,959,765 A | 9/1990 | Weinberg |
| 5,066,900 A | 11/1991 | Bassett |
| 5,113,334 A | 5/1992 | Tuson |
| 5,309,065 A | 5/1994 | Nuckolls et al. |
| 5,343,140 A | 8/1994 | Gegner |
| 5,424,933 A * | 6/1995 | Illingworth ............... 363/21.02 |
| 5,561,597 A | 10/1996 | Limpaecher |
| 5,726,872 A | 3/1998 | Vinciarelli |
| 5,768,113 A | 6/1998 | Safraoui |
| 5,977,754 A | 11/1999 | Cross |
| 5,982,644 A | 11/1999 | Hulsey |

FOREIGN PATENT DOCUMENTS

| | | |
|---|---|---|
| EP | 0 490 639 A2 | 10/1991 |
| WO | WO 94/09559 | 4/1994 |

* cited by examiner

*Primary Examiner*—Bao Q. Vu
(74) *Attorney, Agent, or Firm*—Stetina Brunda Garred & Brucker

(57) ABSTRACT

A high efficiency power converter for generating a high voltage from a low voltage supply. The power converter includes a resonant circuit in electrical communication with the low voltage supply via a switch. The power converter further includes a control circuit in electrical communication with the switch and a resonant inductor of the resonant circuit. The control circuit is operative to open and close the switch in response to the current flowing through the resonant inductor. A transformer is connected parallel to the resonant inductor and is operative to generate the high output voltage from the voltage of the resonant inductor. In the preferred embodiment, the switch is closed at the point in time when the current in the resonant inductor passes zero. At this time, switching conditions within the switch are ideal such that any losses experienced by the switch are conduction losses thereby resulting in improved efficiency of the power converter.

32 Claims, 1 Drawing Sheet

HIGH EFFICIENCY, LOW VOLTAGE TO HIGH VOLTAGE POWER CONVERTER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to voltage converters and more particularly to an apparatus and method of utilizing a Class E converter for improved efficiency.

Voltage converters are typically used to convert voltage at one level to a second desired voltage level. Typically, in order to develop a high output voltage (i.e., several thousand volts) from a low input voltage (i.e., 28 volts), a double conversion process is used. The input voltage is first converted to an intermediate voltage (i.e., several hundred volts), then stepped-up to the final output voltage. A pre-regulator may be used which may provide the advantages of improved regulation and simplified high voltage transformer design, yet a high component count and low efficiency results.

One application for class E resonant power converters is to convert an input voltage level to a desired output voltage level. Such converters typically use a switch for controlling the flow of current to a resonant circuit. A transformer is connected in parallel to the resonant circuit and provides the necessary switching of the power supply in order to increase the voltage. High switching frequencies provide improved efficiency for the Class E resonant power converter by eliminating the cause of switching power dissipation which exists.

However, efficiency decreases if the switch is not correctly operated. Specifically, if the switch is operated during a high current and high voltage situation, power dissipated through the switch is high thereby resulting in decreased efficiency. Therefore, if ideal switching conditions are not met, the efficiency of the Class E power converter is decreased thereby negating any benefits thereof.

The present invention addresses the above-mentioned deficiencies in current Class E power converters by providing a converter which provides ideal switching conditions. Specifically, the switch for the power converter of the present invention will be operated only at an ideal condition by sensing the current flowing through the resonant circuit. The power converter of the present invention provides a Class E power converter with an increase in efficiency because switching losses are minimized.

BRIEF SUMMARY OF THE INVENTION

A high efficiency power converter for generating a high voltage supply from a low voltage supply. The power converter comprises a source inductor in electrical communication with the input low voltage power source. A switch is in electrical communication with the source inductor and a control circuit. The control circuit is operative to open and close the switch thereby generating a conduction period of the switch. The power converter further includes a resonant capacitor in electrical communication with the switch, the power supply inductor, and shunt capacitor as well as a resonant inductor in electrical communication with the resonant capacitor. Accordingly, the resonant capacitor and the resonant inductor from a resonant circuit of the power converter. In electrical communication with the resonant inductor is a transformer operative to generate the high voltage supply from the voltage of the resonant inductor. In order to control the conduction period of the switch, the power converter further includes a current sense circuit in electrical communication with the resonant inductor and the control circuit. The current sense circuit is operative to determine the amount of current flowing through the resonant inductor and control the conduction period of the switch based thereon. In this respect, the switch will be opened and closed under ideal situations based upon the amount of current flowing through the resonant inductor.

In order to provide a DC voltage, the power converter of the present invention may further include a rectification and filtering circuit. The rectification and filtering circuit will be in electrical communication with the output of the transformer such that the power converter will supply a regulated DC voltage. Typically, the input voltage is about 28 volts and the output of the transformer is thousands of volts. In this respect, the transformer may be operative to provide an output voltage to a Traveling Wave Tube (TWT).

In order to provide the output voltage, the power converter may include a shunt capacitor in electrical communication with the switch. Specifically, the shunt capacitor may be connected in parallel across the switch. Furthermore, the transformer is connected in parallel with the resonant inductor. The resonant capacitor will be connected in series with the resonant inductor.

In accordance with the present invention, there is provided a method of generating an output voltage with a power converter constructed in accordance with the preferred embodiment. The method comprises supplying an input voltage to the resonant inductor and the transformer of the power converter. Next, the current through the inductor is sensed. The switch of the power converter is closed in response to the current sensed and the switch is opened in response to the output voltage of the transformer. The output voltage may be compared to a reference voltage in order to open the switch. In this respect, the switch will be opened after switch conduction periods determined by the variation between the output voltage and the reference voltage. Accordingly, a voltage higher than the input voltage is generated at the output of the transformer. It will be recognized that the output of the transformer can be rectified and filtered in order to produce a DC voltage.

BRIEF DESCRIPTION OF THE DRAWINGS

These as well as other features of the present invention will become more apparent upon reference to the drawings wherein.

DETAILED DESCRIPTION OF THE INVENTION

Figure 1:
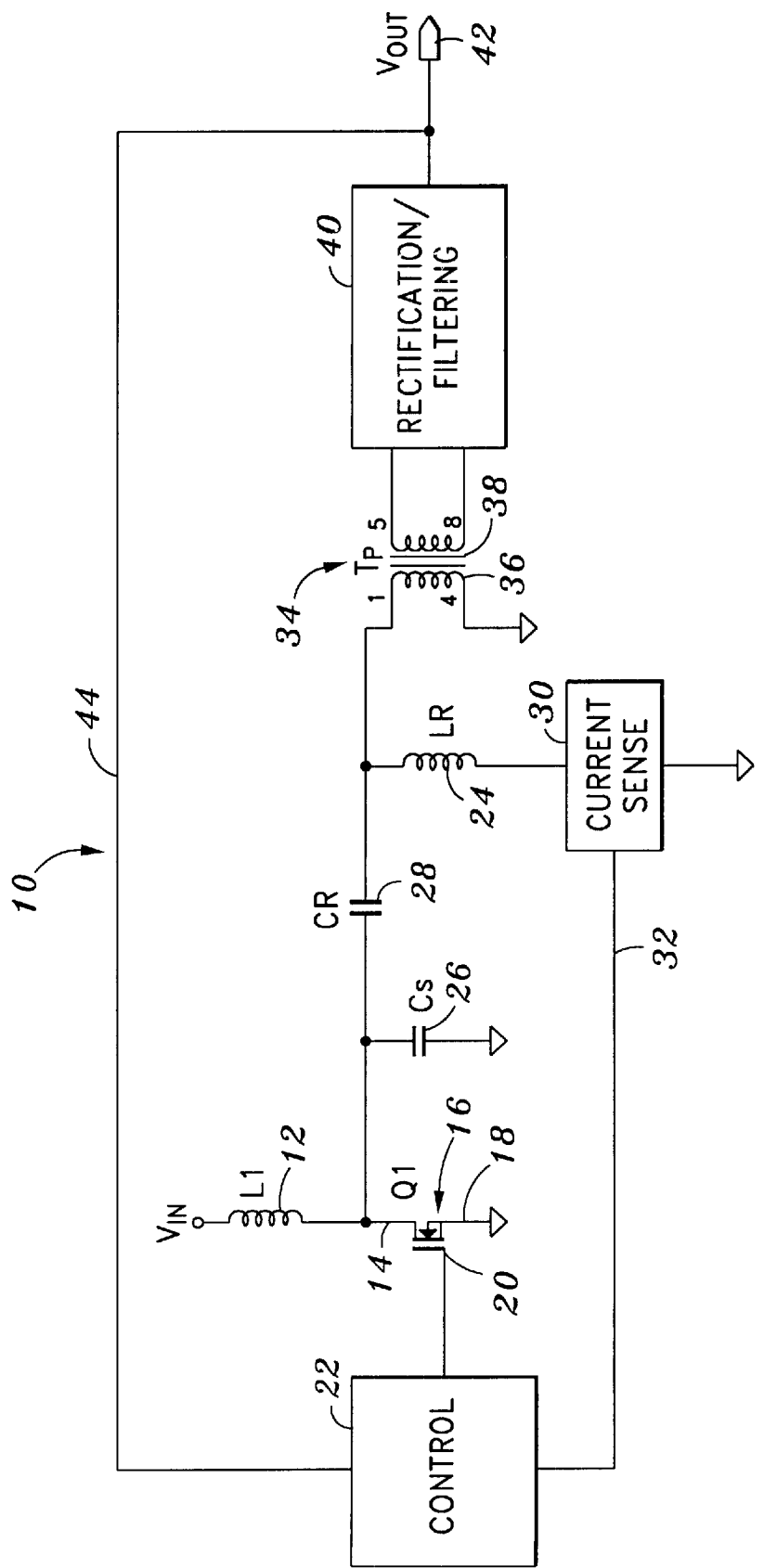
FIG. 1 is a block diagram showing a power converter constructed in accordance with the present invention.

Referring now to the drawings wherein the showings are for the purposes of illustrating a preferred embodiment of the present invention only, and not for the purposes of limiting the same, FIG. 1 illustrates the power converter 10 constructed in accordance with the present invention. The power converter 10 is operative to convert a low voltage input voltage $V_{IN}$ to a high voltage output $V_{OUT}$. Typically, the input voltage is about 28 volts DC and the output is in the order of several thousands of volts DC. The power converter 10 is ideally suited to supply power to a Traveling Wave Tube (TWT) used in high frequency power amplifiers, or as will be recognized to other devices.

The power converter 10 has a power supply inductor 12 electrically connected to $V_{IN}$. The power supply inductor 12 is chosen to have a high reactance at the frequencies of operation of the power converter 10 such that a relatively constant current may be supplied. The power supply inductor 12 is connected to the drain 14 of a switching device 16. The switching device 16 may be a FET or MOSFET operative to handle the switching loads of the power converter 10. A source 18 of the switching device 16 is electrically connected to ground, while a gate 20 of switching device 16 is electrically connected to a control circuit 22. The control circuit 22 contains electronic circuitry operative to turn the switching device 16 on and off via gate 20. The control circuit 22 controls the switching device 16 in response to $V_{OUT}$ and the current flowing through a resonant inductor 24, as will be further explained below.

Connected in parallel to the switching device 16, between the drain 14 and ground, is a shunt capacitor 26. Furthermore, the power converter 10 includes a resonant capacitor 28 electrically connected between the drain 14 of switching device 16 and the resonant inductor 24. In this respect, the resonant inductor 24 is electrically connected to one terminal of the resonant capacitor 28 and ground. The combination of the shunt capacitor 26, the resonant capacitor 28 and the resonant inductor 24 form a resonant circuit of the power converter 10 and are connected in parallel across the switching device 16, as seen in FIG. 1.

The power converter 10 further includes a current sense circuit 30 in electrical communication with the resonant inductor 24. The current sense circuit 30 contains electronic circuitry operative to determine the timing of current flowing through the resonant inductor 24. The current sense circuit 30 is in electrical communication with the control circuit 22 through current sense line 32. In this respect, the current sense line 32 transmits information regarding timing of the current flowing through the resonant inductor 24 to the control circuit 22.

The power converter 10 further includes a power step-up transformer 34 electrically connected in parallel to the resonant inductor 24. The power transformer 34 steps up the voltage appearing across the resonant inductor 24. The power transformer 34 has a primary coil 36 which energizes a secondary coil 38 thereof. With the proper choice of component values, a voltage many times the magnitude of the input voltage VrN may be developed across resonant inductor 24 thereby reducing the step-up ratio for the power transformer 34 and increasing the overall efficiency of the power converter 10. Accordingly, the complexity of the power transformer 34 is reduced and the need for a second conversion stage to attain the needed output voltage is reduced.

Electrically connected across the output terminals of the secondary coil 38 is a rectification/filtering circuit 40 that is operative to convert the AC voltage from the power transformer 34 to a DC voltage. The rectifiers of the rectification/filtering circuit 40 are in a voltage multiplier configuration to reduce the required number of secondary 38 turns and convert the voltage from the secondary coil 38 of the transformer 34 into a usable DC voltage which is present at an output 42. A control line 44 is electrically connected between the output 42 and the control circuit 22. In this respect, the output voltage $V_{OUT}$ is sensed and used by the control circuit 22 to control the conduction period of the switching device 26, as will be further explained below.

In the preferred mode of operation, the control circuit 22 determines the conduction period for the switching device 16. Specifically, the control circuit 22 turnon (i.e., closes) the switching device 16 at the point in time when the current in the resonant inductor 24, as determined by current sense circuit 30, crosses a given threshold near zero. The voltage at the drain of the switching device 16 will have decreased to essentially zero volts at this time, therefore providing ideal switching conditions for switching device 16. Accordingly, the efficiency of power converter 10 is dramatically increased because the only losses within the switching device 16 are conduction losses.

The conduction period of the switching device 16 is a function of the error between the output voltage $V_{OUT}$ and a reference voltage. As previously mentioned, the output voltage $V_{OUT}$ is sensed at output 42 such that control line 44 transmits the output voltage $V_{OUT}$ to the control circuit 22. The switching device 16 is turned off (i.e., opened) when the difference between the output voltage $V_{OUT}$ and the reference voltage exceeds a prescribed value. Conversely, the control circuit 22 will turn on the switching device 16 again when the current in the resonant inductor 24 passes zero, as previously mentioned above. Accordingly, the operation of the switching device 16 on and off will produce an output voltage $V_{OUT}$ many times greater than $V_{in}$ with improved efficiency.

The power converter 10 constructed in accordance with the present invention provides an efficient Class E resonant power conditioner with a low component count and low cost. The power converter 10 is highly reliable due to the low part count and is capable of delivering high power at a high voltage to a load such as a TWT. The power converter 10 utilizes a step-up transformer 34 in which the voltage source for the primary coil 36 is the voltage developed across the resonant inductor 24. Placement of the primary coil 36 of the transformer 34 in parallel with the resonant inductor 24 allows the current through inductor 24 to be utilized independent of the load current.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed:

1. A high efficiency power converter for generating a high voltage from a low voltage supply, the power converter comprising:

a switch in electrical communication with the low voltage supply, the switch having a conduction period;

a resonant capacitor in electrical communication with the switch;

a resonant inductor in electrical communication with the resonant capacitor, the resonant capacitor and the resonant inductor forming a resonant circuit;

a transformer in electrical communication with the resonant inductor, wherein the primary winding of the transformer is placed in parallel relation to the resonant inductor, the transformer operative to generate the high voltage supply;

a current sense circuit in electrical communication with the resonant inductor, the current sense circuit operative to determine the flow of current in the resonant inductor; and a control circuit in electrical communication with the switch and the current sense circuit, the control circuit being configured to control the conduction period of the switch in response to the current flowing through the resonant inductor.

2. The power converter of claim 1 further comprising a power supply inductor in electrical communication with the switch and the low voltage supply, the power supply inductor being operative to provide constant current to the switch.

3. The power converter of claim 1 wherein the switch is configured to be closed when the current in the resonant inductor is about zero.

4. The power converter of claim 3 wherein the transformer has a transformer output and the control circuit is in electrical communication with the output of the transformer such that the control circuit is configured to open the switch in response to the output voltage.

5. The power converter of claim 4 further comprising a rectification and filtering circuit in electrical communication wit the output of the transformer, the rectification and filtering circuit operative to provide a DC voltage.

6. The power converter of claim 5 further comprising a shunt capacitor in electrical communication with the switch.

7. The power converter of claim 6 wherein the converter is configured to operate from a supply voltage of 28 volts.

8. The power converter of claim 7 wherein the transformer is operative to supply an output voltage to a traveling wave tube.

9. The power converter of claim 1 wherein the resonant inductor and the resonant capacitor are connected in series.

10. The power converter of claim 9 wherein the shunt capacitor is connected in parallel to the switch.

11. A method of generating an output voltage with a power converter having a transformer, a resonant inductor connected in parallel to the transformer, and a switch having a conduction period and in electrical communication with the inductor and the transformer, the method comprising the steps:
   a) supplying an input voltage to the inductor and the transformer;
   b) sensing the current through the inductor;
   c) closing the switch in response to the current in the inductor; and
   d) opening the switch in response to the output voltage of the transformer in order to generate an output voltage higher than the input voltage.

12. The method of claim 11 wherein steps (c) and (d) are repeated continuously to generate the output voltage.

13. The method of claim 12 further comprising the step:
   e) rectifying and filtering the output voltage in order to generate a DC output voltage.

14. The method of claim 13 wherein the power converter further includes a current sense circuit in electrical communication with the inductor and step (b) comprises determining the amount of current flowing through the inductor with the current sense circuit.

15. The method of claim 13 wherein the power converter further includes a control circuit in electrical communication with the switch, the output voltage and the current sense circuit and steps (c) and (d) comprise opening and closing the switch with the control circuit in response to the current flowing through the inductor and the output voltage.

16. The method of claim 11 wherein step (c) comprises closing the switch when the current in the inductor is about zero.

17. The method of claim 11 wherein step (d) comprises comparing the output voltage to a reference voltage and opening the switch in response to the difference between the output voltage and the reference voltage.

18. A high efficiency power converter operative to generate a high voltage output from a low voltage input, the power converter comprising:
   a switch in electrical communication with the low voltage input;
   a resonant circuit having a resonant inductor, said resonant circuit in electrical communication with the switch;
   a control circuit in electrical communication with the switch and the resonant circuit, the control circuit being operative to open and close the switch in response to the current in the resonant circuit; and
   a transformer in electrical communication with the resonant circuit wherein said transformer is placed in parallel relation to said resonant inductor, the transformer being operative to generate the high voltage output from the voltage of the resonant circuit.

19. The power converter of claim 18 wherein the resonant inductor in electrical communication with the control circuit such that the control circuit opens and closes the switch in response to the current of the resonant inductor.

20. The power converter of the claim 19 further comprising a current sense circuit in electrical communication with the resonant inductor and operative to determine the current in the resonant inductor.

21. The power converter of claim 20 wherein the control circuit is configured to close the switch when the current in the resonant inductor is about zero.

22. The power converter of claim 21 wherein the control circuit is in electrical communication with the high voltage output and the control circuit is in configured to open the switch in response to the output voltage.

23. The power converter of claim 22 wherein the control circuit is configured to open the switch when the difference between the output voltage and a reference voltage exceeds a prescribed value.

24. The power converter of claim 23 wherein the resonant circuit comprises a resonant capacitor connected in series to the resonant inductor.

25. The high efficiency power converter of claim 1 wherein the frequency of the voltage signal applied to the transformer is defined by the resonant circuit.

26. The high efficiency power converter of claim 1 wherein the current through the resonant circuit is used to regulate the operation of the switch.

27. The high efficiency power converter of claim 1 wherein the switch input signal is independent of the frequency of the signal of the resonant circuit.

28. The high efficiency power converter of claim 1 wherein the voltage frequency applied to the primary winding of said transformer is responsive to the inductance and capacitance values of the resonant circuit components.

29. The high efficiency power converter of claim 18 wherein the frequency of the voltage signal applied to the transformer is defined by the resonant circuit.

30. The high efficiency power converter of claim 18 wherein the current through the resonant circuit is used to regulate the operation of the switch.

31. The high efficiency power converter of claim 18 wherein the switch input signal is independent of the frequency of the signal of the resonant circuit.

32. The high efficiency power converter of claim 18 wherein the voltage frequency applied to the primary winding of said transformer is responsive to the inductance and capacitance values of the resonant circuit components.

* * * * *